United States Patent [19]

Fukuda

[11] Patent Number: 4,501,339

[45] Date of Patent: Feb. 26, 1985

[54] AUTOMATIC WEIGHING APPARATUS

[75] Inventor: Masao Fukuda, Shiga, Japan

[73] Assignee: Kabushiki Kaisha Ishida Koki Seisakusho, Kyoto, Japan

[21] Appl. No.: 420,113

[22] Filed: Sep. 20, 1982

[30] Foreign Application Priority Data

Sep. 24, 1981 [JP] Japan .................. 56-151751

[51] Int. Cl.³ .............. G01G 19/22; G01G 13/02; B65B 1/30; B65B 3/04
[52] U.S. Cl. ................... 177/25; 177/123; 141/83; 141/102; 141/103
[58] Field of Search ......... 177/25, 122, 123, DIG. 11; 141/83, 102, 103

[56] References Cited

U.S. PATENT DOCUMENTS

| | | | |
|---|---|---|---|
| 3,648,741 | 3/1972 | Croasdale et al. | 141/103 X |
| 3,981,394 | 9/1976 | Slathar et al. | |
| 4,206,822 | 6/1980 | Mazzucchelli | 177/25 |
| 4,442,910 | 4/1984 | Mikami | 177/25 |

FOREIGN PATENT DOCUMENTS 1224684 6/1960 France .
2399012 2/1979 France .
1413385 11/1975 United Kingdom .

Primary Examiner—George H. Miller, Jr.
Attorney, Agent, or Firm—Staas & Halsey

[57] ABSTRACT

A combinatorial weighing apparatus is provided with a plurality of weighing heads arranged in a row which is diagonal with respect to the direction of travel of collection buckets in which articles are collected. Discharge buckets are disposed in a row between each weighing head and the path along which collecting buckets are advanced. Each weighing head comprises a weighing machine, a weighing hopper and a device for feeding articles into the weighing hopper. Chutes which are small in length are provided between each row of discharge buckets and the path along which the collecting buckets travel, and serve to guide articles, discharged by the discharge buckets, into a collecting bucket as it is advanced in the collecting direction. The number of discharge buckets in each row increases by one in the direction of travel of the collecting buckets, and the discharge buckets are adapted to be inverted at a position adjacent the corresponding chute to facilitate the discharge operation. Synchronization is established between movement of the discharge and collecting buckets.

6 Claims, 3 Drawing Figures

AUTOMATIC WEIGHING APPARATUS

BACKGROUND OF THE INVENTION

This invention relates to an automatic weighing apparatus and, more particularly, to an automatic weighing apparatus which has a plurality of weighing heads and which is so adapted that articles contained in weighing hoppers belonging to weighing heads selected as the result of a combinatorial weighing operation are discharged from the weighing hoppers of the selected weighing heads and collected with excellent efficiency.

The above-described type of automatic weighing apparatus for performing combinatorial weighing conventionally has a plurality of equally spaced-apart weighing hoppers arranged substantially along the circumference of a circle, and weighing machines associated with each weighing hopper. The apparatus operates by measuring, by means of the weighing machines, the weights of articles contained in the weighing hoppers, adding together arbitrary or predetermined numbers of the obtained weight values, comparing each resulting sum with a set weight (combinatorial weighing), and selecting the combination (known as the "best" combination) of weighing hoppers that gives a total article weight equal or closest to the set weight. The selected weighing hoppers are then opened to release their articles into a chute, whence the released articles are received in a collecting bucket for conveyance to the next processing step.

In the conventional weighing apparatus of the above type, the articles discharged from the weighing hoppers fall under thier own weight while rolling or sliding along the inwardly inclined walls of the chute. Owing to differences in the shape or individual weight of the articles, however, the articles do not necessarily fall at the same speed and therefore are not always discharged into the collecting bucket at one time. This has made it difficult to raise the article discharge rate and, therefore, to achieve a high-speed weighing operation. Furthermore, when the articles discharged into the chute come together at one time near the chute outlet, a so-called bridging effect can cause the articles to pile up within the chute. This sometimes makes it necessary to stagger the discharge timing of each of the weighing hoppers in advance, thereby inevitably slowing down the article discharge rate and making high-speed weighing impossible. Also, since the distance over which the articles fall is substantial, the articles can sustain damage while falling and are the source of noise as they collide with the chute and with one another. Since the walls of the chute are inwardly inclined, moreover, extremely fine articles or powders and other materials that do not fall easily tend to attach themselves to the chute surface and give rise to a weighing error. A possible solution to this problem would be to have a chute of considerable height, but this would increase the height of the apparatus as a whole. Still another defect encountered with the aforementioned article discharge structure is that, once the articles have been released into the chute, the release of articles based on the next weighing operation cannot take place until the previously released articles within the chute have been discharged into the collecting bucket. The result is a limitation on the article discharge capacity.

SUMMARY OF THE INVENTION

Accordingly, an object of the present invention is to provide an automatic weighing apparatus having a plurality of weighing heads arranged in a row diagonally with respect to the direction in which articles are collected, a plurality of collecting buckets advanced incrementally along a path in said direction diagonal to the row of weighing heads, and discharge buckets provided between each weighing head and the collecting bucket path, the number of the discharge buckets associated with each weighing head conforming to the position of said weighing head in the row.

Another object of the present invention is to provide an automatic weighing apparatus wherein a short chute, leading from a discharge bucket to a collecting bucket, is provided for each of a plurality of weighing heads, thereby eliminating damage to the articles caused by transit through the chutes, and making it possible to achieve high-speed weighing, without raising the cost of the apparatus, owing to a reduction in the time needed for article discharge through the chutes.

Still another object of the present invention is to provide an automatic weighing apparatus wherein discharge buckets are adapted so as to be inverted for discharging articles into a chute, whereby the articles within the discharge buckets are forcibly dropped into the chute from one end of said buckets to eliminate weighing errors that might otherwise be caused by articles or particulate matter attaching to the buckets.

A further object of the present invention is to provide an automatic weighing apparatus wherein the movement of collecting buckets is synchronized with the movement of discharge buckets carrying weighed out articles, whereby articles released simultaneously by any combination of the weighing heads whatsoever can be discharged into the same collecting bucket in reliable fashion, with a plurality of the discharge buckets being provided for each weighing head so that, after articles have been released into one discharge bucket, the next article discharge bucket may be brought into position to enable continuous discharge of the articles into said buckets.

Other features and advantages of the invention will be apparent from the following description taken in connection with the accompanying drawings, in which like reference characters designate similar or corresponding parts throughout the several views thereof.

DESCRIPTION OF THE PREFERRED EMBODIMENT

Figure 1:
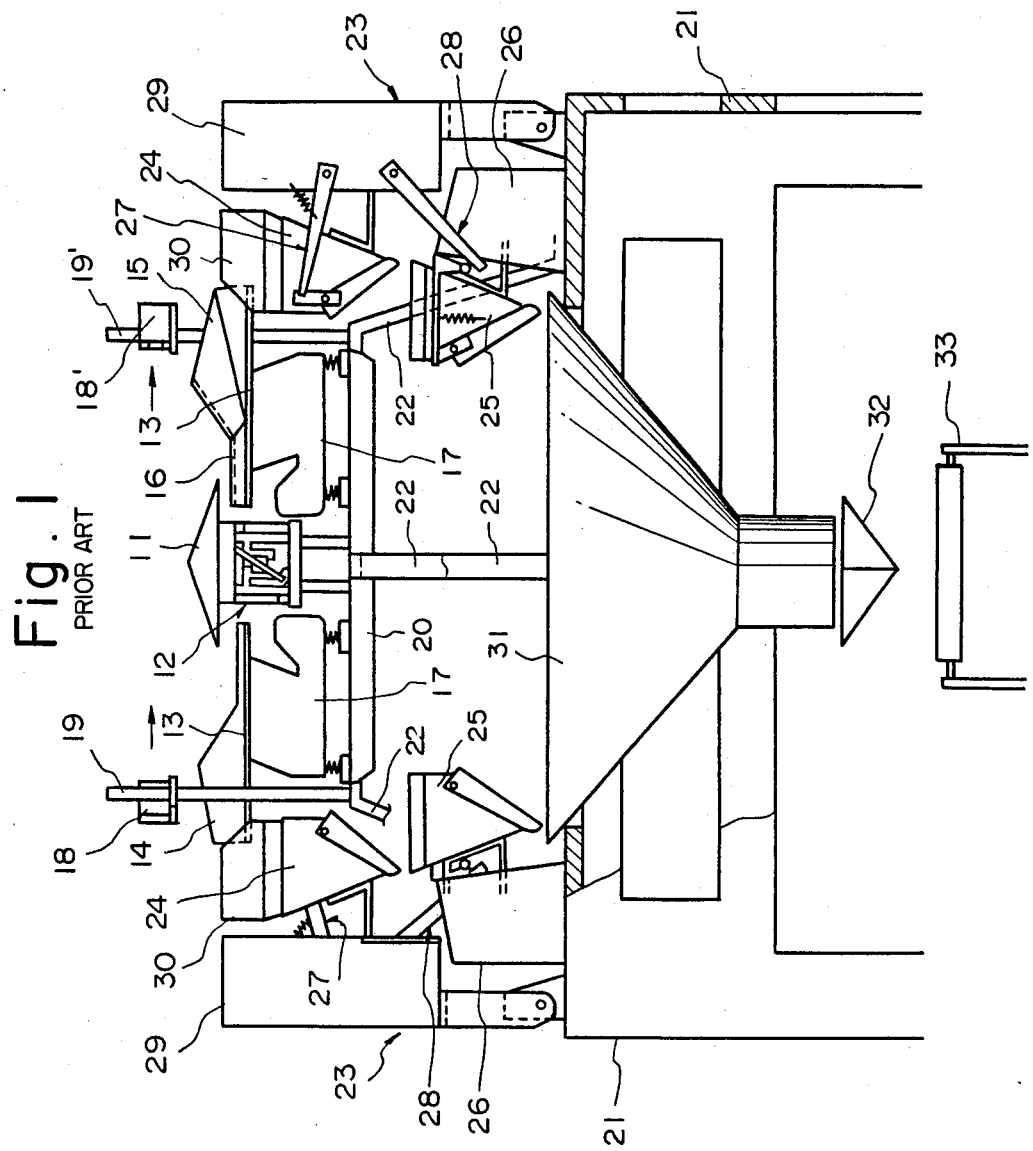
FIG. 1 is a side view illustrating a combination computing type automatic weighing apparatus according to the prior art.

Referring to FIG. 1 illustrating a conventional combination computing type automatic weighing apparatus, numeral 11 designates a conically shaped distribution table supported on an electro-magnetically operated vibrator 12. Numeral 13 designates a plurality of radial supply troughs disposed around the distribution table 11, each supply trough having a radially inner end positioned below and adjacent to the outer peripheral edge of the distribution table. Only two of the supply troughs 13 are shown in the side elevation of FIG. 1. Each supply trough 13 has a radial passage defined by an angularly edged vertical wall 14 and another vertical wall composed of an angularly edged and outwardly inclined wall portion 15 which extends two-thirds of the wall and an outwardly inclined wall portion 16 which extends one-third of the wall along the vertical wall 14 of the adjacent supply trough. The inclined wall portions 15, 16 have portions extending in overhanging relation to the vertical wall of the adjacent supply trough 13 for avoiding direct mechanical contact therewith. Each of the supply troughs 13 is supported on an electro-magnetically operated vibrator 17, with the vibrators 12 and 17 being supported on a common support table 20 secured on a plurality of support posts 22 secured in turn to a frame 21. A support post 19 fitted with a light projector 18 and another support post 19' fitted with a light receiver 18' are secured on the support table 20 in symmetrical relation to the distribution table 11. Numeral 23 designates a plurality of weighing machines each of which is made up of a pool hopper 24 for receiving articles delivered from the troughs 13, a weighing hopper 25 adapted to receive the articles from the pool hopper 24, a weighing mechanism 26 adapted to weigh the articles contained in the hopper 25, and a driving part 29 adapted to open or close the pool hopper 24 and the weighing hopper 25 by means of levers 27, 28. Each supply trough 13 has its foremost part projecting into the pool hopper 24 associated therewith so that the articles supplied from the trough 13 may be introduced into said pool hopper 24. Each pool hopper 24 has a guide plate 30 provided on the upper side thereof. Numeral 31 denotes a funnel-shaped collecting chute whose upper end is opened wide enough to receive articles released by the weighing hoppers 25 of the weighing machines, and whose lower open end is adapted to discharge the articles into a timing hopper 32 located above a conveyor 33.

In operation, the articles supplied onto the distribution table 11 are distributed to the supply troughs 13 by the operation of the vibrator 12. The troughs 13 are also set into oscillation by the vibrator 17 so that the articles on the troughs 13 may be introduced into the pool hoppers 24 and thence into the weighing hoppers 25 where they are weighed and the resulting weight values are processed by an electronic circuit that performs combinatorial computations. In this manner, the combination of articles that gives a total weight equal or closest to a preset weight is selected and the weighing hoppers 25 corresponding to such combination are opened so that the articles contained in these hoppers are discharged into the collecting chute 31 and thence discharged into the timing hopper 32 above the conveyor 32. The articles to be weighed are supplied onto the distribution table 11 by a supply conveyor (not shown). The article supply operation is controlled based upon the transmission of a light signal from the projector 18 to the receiver 18', so that the distribution table 11 is always supplied with a constant number of articles to be weighed.

Figure 2:
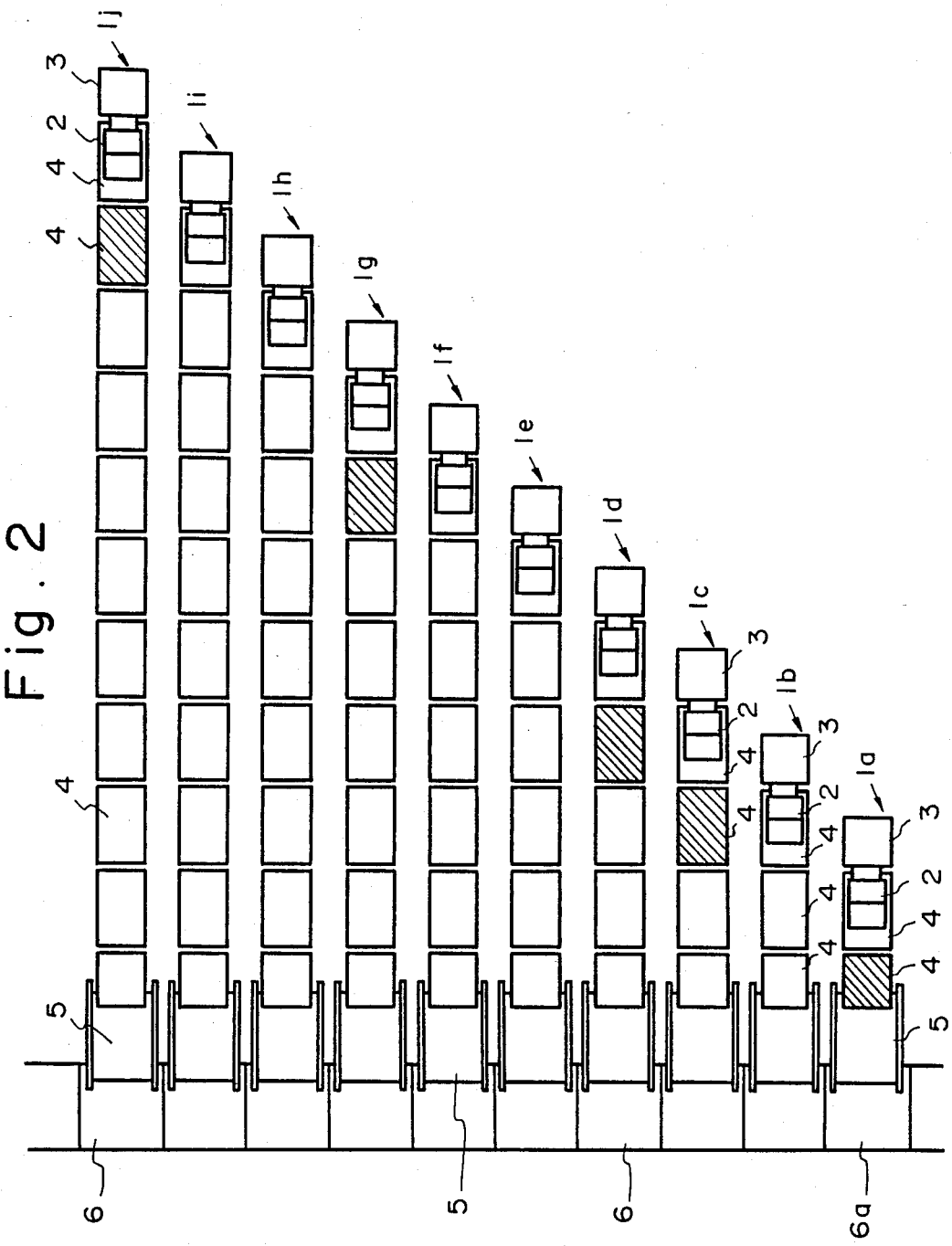
FIG. 2 is a plan view illustrating an embodiment of an automatic weighing apparatus according to the present invention.
Figure 3:
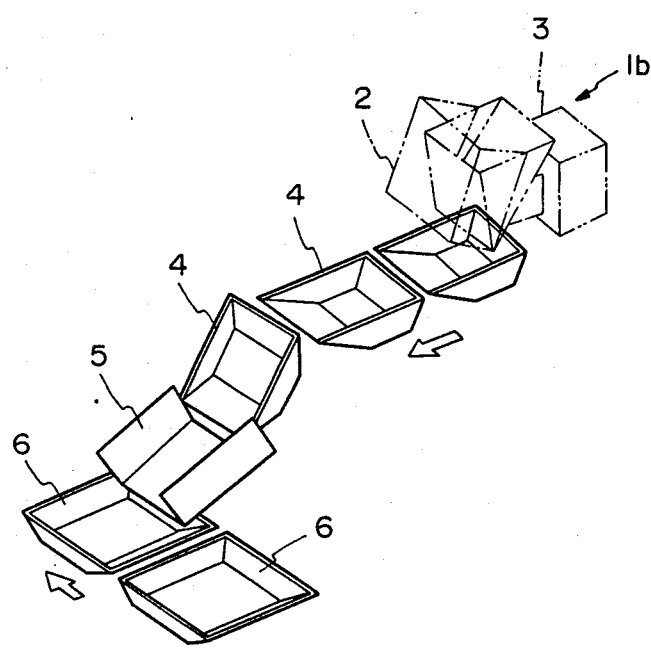
FIG. 3 is a perspective view illustrating the movement of a discharge buckets and collecting buckets in the automatic weighing apparatus of FIG. 2.

Referring now to FIGS. 2 and 3 illustrating an embodiment of an automatic weighing apparatus according to the present invention, there are provided a plurality of weighing heads 1a through 1j each comprising a weighing hopper 2, a weighing machine 3 and a feeder, not shown, for feeding a suitable quantity of articles to the weighing hopper 2. A plurality of discharge buckets 4 or a segmented transporting row is provided for each weighing head for carrying the articles released from the weighing hopper 2 thereof to a corresponding chute 5 where they are discharged into a collecting bucket 6 or a segmented collecting means. The collecting bucket 6 or the segmented collecting means advance along a path in an advancing or transporting direction. The discharge buckets or segmented transporting rows have an upstream end adjacent to a corresponding weighing head and a downstream end adjacent to the path. For the weighing head 1a, the number of discharge buckets 4 provided is such as will allow the operation of carrying and discharging articles from the weighing hopper 2 to the chute 5 to proceed smoothly. The arrangement is such that the discharge buckets 4 for all of the weighing heads travel in circulating fashion, with each discharge bucket being inverted when it arrives at a chute 5 during the discharge operation to discharge its articles into the chute 5. For the weighing head 1b, one additional discharge bucket 4 or row segment is provided, and so on for the weighing heads 1c through 1j so that each succeeding weighing head has one more discharge bucket 4 than the preceding weighing head. The weighing heads 1a through 1j therefore define a diagonal row with respect to a collecting bucket transfer path, to be described below. Each of the chutes 5 is small in length, being only long enough to receive the articles from the discharge buckets 4 and to deliver the articles to a collecting bucket 6. The arrangement is such that each of the collecting buckets 6 advances incrementally along a transfer path, in the direction of the arrow shown in FIG. 3, from one chute 5 to the immediately succeeding chute 5 while each discharge bucket 4 advances from right to left by a distance corresponding to the amount of collecting bucket transfer from chute to chute. In other words, the movements of the collecting buckets 6 and discharge buckets 4 are synchronized.

In operation, articles to be weighed are fed into the weighing hoppers 2 of the respective weighing heads 1a through 1j, whereupon the corresponding weighing machines 3 weigh the articles. Weight combinations are computed based on the obtained weight values, and the combination of weighing heads that gives a total weight equal or closest to a set weight is selected. Assume now that the selected combination of weighing heads is made up of weighing heads 1a, 1c, 1d, 1g and 1j. The weighing hoppers 2 associated with these selected weighing heads will therefore release their articles into corresponding ones of the discharge buckets 4 located therebelow. When the articles have been released from the weighing hoppers, the discharge buckets 4 which have received the articles are transferred in sync with the incremental advance of the collecting buckets 6. The hatched lines in FIG. 2 indicate the discharge buckets 4, which have received the articles from the abovementioned weighing hoppers, after having travelled a distance equivalent to one increment of movement. By way of example, the articles released from the weighing hopper of the first weighing head 1a are discharged into the corresponding collecting bucket 6a via chute 5 by the indicated discharge bucket 4 which has covered a distance equivalent to one increment of movement. This same collecting bucket 6a, after receiving the articles from said discharge bucket 4, is incremented by one step to the next chute 5, while the buckets 4 are advanced in sync therewith. No articles are received at this next chute 5, however, since the corresponding weighing head 1b was not selected by the foregoing combinatorial computation. When the collecting bucket 6a arrives at the chute 5 corresponding to the third weighing head 1c, on the other hand, the discharge bucket 4 carrying the articles from the selected weighing head 1c arrives at said chute at the same time and discharges its articles into the collecting bucket 6a. Likewise, the collecting bucket 6a will receive the articles from the selected weighing heads 1d, 1g and 1j as it arrives at the corresponding chutes 5, and will then proceed to carry all of the collected articles to the next processing stage.

Meanwhile, the weighing hoppers 2 that have emptied their articles into the discharge buckets 4 are resupplied with articles from the feeding device. These articles are then weighed. Now a combinatorial computation is performed based on the weight values of the newly supplied articles and on the remaining weight values obtained from the weighing heads which were not selected by the previous combinatorial computation. Of the combinations computed, that which gives a total weight equal or closest to the set weight is selected. Following the selection of this combination, the foregoing discharge operation is repeated to collect all of the selected and discharged articles in the same one of the collecting buckets 6.

It goes without saying that the collecting buckets 6 described above can be replaced by a conveyor arrangement or the like.

According to the present invention as described and illustrated hereinabove, the movements of the collecting buckets 6 and discharge buckets 4 carrying the articles are synchronized, and the number of discharge buckets 4 disposed between each weighing head and chute 5 is increased by one in the direction of collecting bucket advance. The articles released simultaneously by the weighing heads can therefore be discharged reliably into the same collecting bucket regardless of the weighing head combination selected, thereby eliminating collection errors. Moreover, since the discharge buckets discharge their articles into the chutes by being inverted, the articles are dropped from the discharge buckets forcibly to assure that matter will not remain attached to the buckets to cause a weighing error. Since the chutes 5 are short and the discharge buckets 4 travel substantially horizontally, the weighing hoppers 2, discharge buckets 4 and collecting buckets 6 can be arranged on substantially the same level to shorten the article falling distance. This minimizes noise and lightens the impact sustained by the articles as they fall, thereby eliminating damage to the articles. Moreover, the shorter falling distance reduces the discharge time.

Another advantage of the invention is that a plurality of the discharge buckets 4 are provided for each weighing head. Accordingly, after the weighing hopper of a particular weighing head has released its articles into one of the discharge buckets in the manner described above, the next discharge bucket is brought into position relative to the weighing hopper to enable a continuous discharge operation. Therefore, even when articles initially released from a weighing hopper have not yet not been collected in a collecting bucket, that same hopper is capable of making a subsequent release of articles into a succeeding discharge bucket. Combinatorial weighing may thus proceed in a continuous manner to achieve a high-speed weighing operation.

As many apparently widely different embodiments of the present invention can be made without departing from the spirit and scope thereof, it is to be understood that the invention is not limited to the specific embodiments thereof except as defined in the appended claims.

What I claim is:

1. A combinatorial weighing apparatus for automatically weighing articles, comprising:
    a plurality of collecting buckets for collecting the articles, adapted to be advanced along a path having an advancing direction;
    a plurality of weighing heads, arranged on a diagonal row with respect to the advancing direction of the path, for receiving batches of the articles, obtaining weight values of the batches of articles received, computing weight combinations on the basis of the weight values of the batches of articles, selecting a combination of batches of articles having a total weight equal or closest to a set weight, and discharging the selected batches of articles; and
    a plurality of groups of discharge buckets, each group of discharge buckets corresponding to one of the weighing heads, being arranged in a row, and extending from the corresponding one of the weighing heads to the path in a direction substantially perpendicular to the advancing direction of the path, the number of discharge buckets in each row increasing by one in the advancing direction of the path so as to determine the angle of the diagonal row of weighing heads with respect to the advancing direction of the path, the discharge buckets being adapted to move along the rows from the weighing heads to the path in synchronization with the advance of the collecting buckets so that the discharge buckets receive batches of articles from the weighing heads and discharge the batches of articles into the collecting buckets and so that each collecting bucket receives a selected combination of batches of articles.

2. A combinatorial weighing apparatus according to claim 1, wherein each of the discharge buckets is adapted to invert so as to discharge the batches of articles received by the discharge bucket into one of the collecting buckets.

3. A combinatorial weighing apparatus according to claim 1, wherein each row of discharge buckets has a downstream end adjacent to the path, further comprising a plurality of chutes, the number of chutes corresponding to the number of rows, each chute being disposed between the downstream end of a corresponding row and the path so as to guide the batches of articles discharged from the most downstream discharge bucket into the collecting buckets.

4. A combinatorial weighing apparatus according to claim 1, wherein each of said weighing heads includes a feeder, a weighing machine and a weighing hopper associated with the weighing machine.

5. A combinatorial weighing apparatus according to claim 1, wherein each group of discharge buckets travels along a row in a circulating fashion.

6. A combinatorial weighing apparatus for automatically weighing articles, comprising:
    segmented collecting means having a plurality of segments for collecting batches of articles, adapted to be transported along a path having a transporting direction;
    a plurality of segmented transporting rows, each segmented transporting row having an upstream end, a downstream end and a plurality of segments, the downstream end of each transporting row being adjacent to the path, the transporting rows being substantially parallel to each other and substantially perpendicular to the transporting direction of the path, each transporting row having a length defined by the number of segments in the transporting row, the number of segments in at least some of said rows increasing along the length of the row in the transporting direction of the path, said transporting rows being transportable toward the path in synchronization with the transporting of the segmented collecting means; and a plurality of weighing heads, the number of weighing heads corresponding to the number of transporting rows, each weighing head being disposed at the upstream end of a corresponding transporting row, the weighing heads receiving batches of articles, obtaining weight values of the batches of articles, computing weight combinations on the basis of the weight values of the batches of articles, selecting a combination of batches of articles having a total weight equal or closest to a set weight, and discharging the selected combination of batches of articles onto segments of corresponding transporting rows so that each segment of the segmented collecting means collects a selected combination of articles.

* * * * *